United States Patent [19]
Armbrust et al.

[11] 4,049,860
[45] Sept. 20, 1977

[54] PAPER SUPPORT CARRYING ANTI-ADHESIVE LAYER

[75] Inventors: Ludwig Armbrust, Hassloch; Jürgen Neubert, Esthal, both of Germany

[73] Assignee: Hoffmann & Engelmann, Germany

[21] Appl. No.: 742,577

[22] Filed: Nov. 17, 1976

[30] Foreign Application Priority Data

Nov. 19, 1975 Germany ............................ 2551860

[51] Int. Cl.² ............................................... B32B 3/00
[52] U.S. Cl. ...................................... 428/201; 428/40; 428/211; 428/447; 428/452; 428/914
[58] Field of Search ................. 428/40, 201, 202, 203, 428/211, 342, 447, 452, 914, 913

[56] References Cited

U.S. PATENT DOCUMENTS

| | | | |
|---|---|---|---|
| 2,811,475 | 10/1957 | Edge | 428/914 |
| 3,087,832 | 4/1963 | Fogle | 428/914 |
| 3,215,575 | 11/1965 | Gobel | 428/914 |
| 3,294,612 | 12/1966 | Pail et al. | 428/914 |
| 3,375,125 | 3/1968 | Shenian | 428/914 |
| 3,857,720 | 12/1974 | Fellows | 428/447 |

*Primary Examiner*—William J. Van Balen
*Attorney, Agent, or Firm*—James E. Bryan

[57] ABSTRACT

This invention relates to an improvement in a paper support for receiving on one side thereof layers of print and/or varnish, in particular for receiving transfer images, the improvement comprising a water-permeable covering layer on the other side containing polyvinyl alcohol, a polysiloxane, and a polyalkyleneglycol wax. The invention also includes an article employing the improved paper support.

12 Claims, 1 Drawing Figure

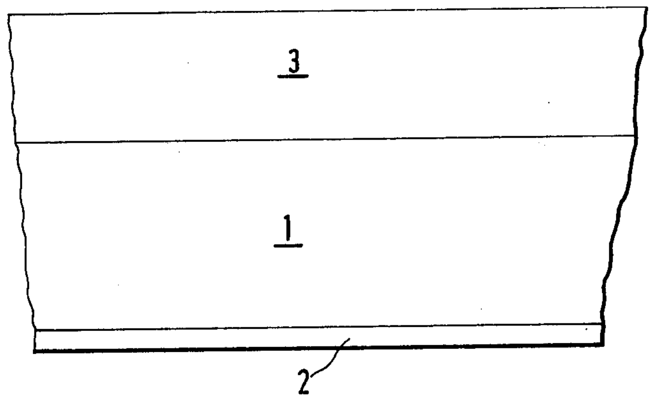
3
1
2

PAPER SUPPORT CARRYING ANTI-ADHESIVE LAYER

This invention relates to supports comprising paper that are capable of supporting on a side thereof a material, for example print and/or or a layer of varnish, especially transfer images.

It has been proposed to support transfer images, which may be used for decorating articles comprising a ceramic, porcelain, glass, enamel, metal and the like, on a water-permeable paper sheet to which there is applied a cohesive film, which film can be released by water and comprises a varnish masking film covering the decorative image. It has been proposed to use, for example, acrylic resins as the masking film and to apply the film by a screen-printing process, usually so that the applied film covers substantially only the transfer images. The film stiffens the relatively thick images so they can be easily transferred, without damage, by sliding them from the support onto the article to be decorated. Furthermore, the acrylic resin varnish preferably is used in those cases where the transfer image is later to be burned-in, since acrylic resins quickly decompose when baked and do not pass through a liquid stage, which could cause the decoration to disintegrate. The nature of the film of varnish is of decisive importance in the intended use of the transfer images; inter alia, rigidity, hardness and expansibility must be kept within certain limits.

It has been found that when such supports bearing transfer images are stacked one upon another the film on a lower support in the stack tends to adhere to the rear surface of the paper support next above it especially when there is a relatively high compressive stress on the film and particularly if the film must cover a relatively thick, relief-type transfer image. This sheet-like or, in the case of few film areas, almost punctiform adhesion of the film of varnish to the respective rear side of the superposed stacked sheet on the one hand is caused by the weight of superposed supports and, on the other hand, by the prevailing temperature and air humidity and retained solvent residues or plasticizer additives in the film.

To prevent the printed and/or varnished sheets from sticking together, waxed tissue paper hitherto has been placed between the individual sheets. Also, attempts already have been made to prevent the undesirable adhesion to the adjacent sheet by covering the printed or varnished layer with wax-type products. A disadvantage in this case, however, is that each individual sheet must be subjected to a wax coating process. In addition the problem of adhesion to adjacent sheets would not be completely overcome thereby.

The provision of intermediate layers of tissue paper, which results in satisfactory transfer images even after prolonged storage of the supports in a stack, is very expensive and requires the additional process steps of carefully introducing and removing the intermediate sheets which cannot be reused as intermediate layers. In addition the supports must, before use, be cut up in accordance with the transfer images to be transferred in any particular case and transfer images that are superfluous are usually stored again stackwise on their supports without intermediate layers of tissue paper. This may result in those unused images adhering to an adjacent support in the stack, so rendering them unsuitable for later use, for the reasons explained above.

There is, therefore, a need to provide a method of overcoming the above described disadvantages so that, on stacking, adhesion between the varnished images and the rear surface of the adjacent paper support does not occur and in which the use of intermediate layers is unnecessary.

The present invention provides a sheet-like support comprising paper, for example a support for transfer (decalcomania) images, one surface (hereinafter called the rear surface) of which support has thereon a water-permeable layer containing a polysiloxane and a polyalkylene glycol wax.

The water permeable layer preferably contains approximately 0.5 to 10% by weight of polysiloxane and from 5 to 15% by weight of polyalkylene glycol calculated on the dry layer.

Material, for example transfer images and overlying protective films may be applied to, and stored on, the other surface (hereinafter called the upper surface) of the support. Adhesion of material on the upper surface to the rear surface of an adjacent support in a stack no longer occurs to any appreciable extent.

The water-permeable layer may be continuously applied to the support. The polyalkylene wax component provides for the adjustment of the water-permeability of the layer and imparts to the rear surface of the support, in the dry state, an advantageous wax-like finish.

If the support is to be used to bear one or more transfer images, the upper surface of the support preferably has thereon a water-soluble coating that is capable of well receiving print, for example. Hydrophobic properties are not desirable since they render processing, impossible, for example, in lithographic or offset printing. The support must, on the contrary, have a good absorption capacity through its rear surface so that, upon moistening with water, the support can be released satisfactorily and completely from the transfer image to be transferred.

Consequently, the rear surface of the support must have water-conveying properties, but its upper surface, on the other hand, must not be hydrophobic. It was therefore, completely surprising that the rear surface of the support can be provided with covering layer that has an anti-adhesive action, i.e. hydrophobic properties, but that is still sufficiently water-permeable.

It was also discovered that, as a result of the presence of the water-permeable layer, the support has a lesser tendency to curl and that its rigidity is additionally increased. This has proved advantageous in cases where the support is passed through a drying channel between printing passages, for example, the passages in which it receives the layers of print and varnish.

The water-permeable layer containing the polysiloxane may be applied to the rear side of the support in the form of an aqueous coating medium, the polysiloxane used preferably initially being in the form of an emulsion that is miscible in any desired ratio with water. The polysiloxane film produced by condensation is migration-resistant and a transfer to adjacent layers does not occur.

The polysiloxane preferably comprises an organo-polysiloxane, a dialkylsiloxane polymer or, especially, a dimethylsiloxane polymer.

As the polyalkyleneglycol wax there is preferably used a polyethyleneglycol and the wax preferably has a molecular weight of between 1500 and 6000.

The coating medium may contain, in addition, polyvinyl alcohol which enhances the anti-adhesive action of the layer and is used in particular to adjust the viscosity of the medium. There has proved to be particularly advantageous a coating solution which, on account of its viscosity, limits the penetration of the liquid into the absorbent support. Advantageously, a mixture of polyvinyl alcohols of differing viscosity is used. The polyvinyl alcohol(s) is or are preferably present in a quantity of approximately 70 – 80% by weight, calculated on the dry layer.

A support of the invention will now be described in more detail, by way of example only, with reference to the accompanying drawing, which is an elevation of art of the support, and the Examples.

Referring to the sole FIGURE, the support comprises a layer of paper 1 having on its rear surface a water-permeable layer 2 containing a polysiloxane and a polyalkylene glycol wax. The upper surface of the paper layer 1 has thereon a resin and/or varnish layer 3. In the case where the paper layer 1 bears one or more transfer images, the layer 3 comprises a lower gum layer, a transfer image layer and a top varnish mask layer.

EXAMPLES

Two coating media were prepared as follows:

17 parts by weight of polyvinyl alcohol (Gohsenol GL 02 of Nippon Chemical Ind., Osaka), 17 parts by weight of polyvinyl alcohol (Moviol 30/88 of Hoechst Aktiengesellschaft), in 15 parts by weight of methanol and 3.5 parts by weight of polyglycol 4000 (polyethylene glycol having a molecular weight of approximately 4000) were added in one case to a. 6.5 parts by weight of a silicone emulsion (anti-adhesive) in combination with 0.35 part by weight of a cross-linking agent and 0.70 part by weight of catalyst (Wacker-Chemie, VP 1522, 1084 and 1515) and in the other to b. 2.15 parts by weight of a silicone emulsion (anti-adhesive) in combination with 0.11 part by weight of a cross-linking agent and 0.2 part by weight of catalyst (as under a) each in 100 ml of water. The media were well stirred and were used, separately, for forming a dry, water-permeable coating on the rear surfaces of two transfer image paper supports.

The viscosity of each of the two solutions was measured in a Ford beaker (DIN 53,211) and amounted at 20° C to 32 seconds.

Both supports were found to be sufficiently water-permeable through their respective surfaces and the anti-adhesive effect is adequate to prevent adhesion of varnished transfer images to the rear surfaces of the supports even under unfavorable storage conditions. This was examined by placing five printed and varnished paper sheets processed as described above one above the other on a glass disc of the same size then covering them with a further glass disc. The specimen was kept at 40° C and 60% relative humidity and loaded over a period of 24 hours with a pressure of 15 $g/cm^2$, which corresponds to a stack of approximately 1000 sheets. The result was that the rear surfaces of the paper sheets did not exhibit any traces of adhesion to the varnish mask.

It will be obvious to those skilled in the art that many modifications may be made within the scope of the present invention without departing from the spirit thereof, and the invention includes all such modifications.

What is claimed is:

1. In a paper support for receiving on one side thereof layers of print and/or varnish, in particular for receiving transfer images, the improvement comprising a water-permeable covering layer on the other side containing polyvinyl alcohol, a polysiloxane, and a polyalkyleneglycol wax.

2. A support according to claim 1 wherein said water-permeable layer contains approximately 0.5 to 10% by weight of polysiloxane, calculated on the dry water-permeable layer.

3. A support according to claim 1 wherein said water-permeable layer contains an organopolysiloxane.

4. A support according to claim 1 wherein said water-permeable layer contains a dialkylpolysiloxane.

5. A support according to claim 1 wherein said water-permeable layer contains a dimethylsiloxane polymer.

6. A support according to claim 1 wherein the polyalkyleneglycol wax comprises a polyethyleneglycol wax.

7. A support according to claim 6 wherein the polyethyleneglycol wax has a molecular weight between about 1500 and 6000.

8. A support according to claim 1 wherein polyalkyleneglycol wax is present in an amount in the range of about 5 to 15% by weight calculated on the dry water-permeable layer.

9. A support according to claim 1 wherein said layer contains about 70 – 80% by weight of polyvinyl alcohol calculated on the dry layer.

10. An article comprising a support as claimed in claim 1 bearing at least one transfer image on the surface remote from said covering.

11. An article as claimed in claim 10 wherein each transfer image is adhered to said remote surface by an adhesive and has a protective coating thereon.

12. An article as claimed in claim 11 wherein said protective coating comprises a varnish.

* * * * *